United States Patent
Morrison (10) Patent No.: US 9,474,292 B1
(45) Date of Patent: Oct. 25, 2016

(54) NUTRITIONAL POWDER INCLUDING BREWER'S YEAST, ARONIA EXTRACT, AND CRANBERRY EXTRACT FOR ANIMALS

(71) Applicant: K9O Inc., Omaha, NE (US)

(72) Inventor: Ryan M. Morrison, Omaha, NE (US)

(73) Assignee: EvoSci Biotech LLC, Omaha, NE (US)

( * ) Notice: Subject to any disclaimer, the term of this patent is extended or adjusted under 35 U.S.C. 154(b) by 2 days.

(21) Appl. No.: 14/281,982

(22) Filed: May 20, 2014

Related U.S. Application Data (63) Continuation-in-part of application No. 13/234,251, filed on Sep. 16, 2011, now abandoned.

(60) Provisional application No. 61/383,467, filed on Sep. 16, 2010, provisional application No. 61/470,621, filed on Apr. 1, 2011, provisional application No. 61/509,136, filed on Jul. 19, 2011.

(51) Int. Cl.
| | |
|---|---|
| A23K 1/00 | (2006.01) |
| A23K 1/16 | (2006.01) |
| A23K 1/17 | (2006.01) |
| A23L 1/30 | (2006.01) |
| A23K 1/175 | (2006.01) |

(52) U.S. Cl.
CPC .............. *A23K 1/008* (2013.01); *A23K 1/1603* (2013.01); *A23K 1/164* (2013.01); *A23K 1/1609* (2013.01); *A23K 1/1751* (2013.01); *A23K 1/1753* (2013.01); *A23L 1/3002* (2013.01)

(58) Field of Classification Search
CPC ....... A23L 1/30; A23L 1/302; A23L 1/3008; A23L 1/3016; A23L 1/304; A23L 1/3045; A61K 45/06; A61K 35/57; A23V 2002/00
See application file for complete search history.

(56) References Cited

U.S. PATENT DOCUMENTS

| | | | |
|---|---|---|---|
| 5,919,483 | A | 7/1999 | Takaichi et al. |
| 6,811,793 | B2 | 11/2004 | Wehling |
| 6,838,092 | B2 | 1/2005 | Mercati |
| 2005/0244518 | A1* | 11/2005 | Huang et al. ................. 424/736 |
| 2006/0024397 | A9* | 2/2006 | Nair et al. ..................... 424/777 |
| 2006/0159781 | A1 | 7/2006 | Magnuson et al. |
| 2006/0210697 | A1* | 9/2006 | Mower ......................... 426/658 |
| 2007/0116838 | A1* | 5/2007 | Prakash et al. ............... 426/548 |
| 2007/0141138 | A1* | 6/2007 | Feuerstein et al. ........... 424/451 |
| 2008/0292607 | A1 | 11/2008 | Mazzio et al. |
| 2009/0004262 | A1* | 1/2009 | Shaw et al. ................... 424/456 |
| 2011/0117207 | A1* | 5/2011 | Minatelli et al. ............. 424/581 |
| 2011/0171187 | A1* | 7/2011 | Moore et al. ............... 424/93.51 |

OTHER PUBLICATIONS

"OVN Vitamins—Bacon Jerky Flavor (10 Tabs)", printed from website http://web.archive.org/web/20090228082050/http://www.entirelypets.com/ovnbaconjerky1, Nov. 2, 2012, 6 pages.

* cited by examiner

*Primary Examiner* — Brian-Yong Kwon
*Assistant Examiner* — Mark V Stevens
(74) *Attorney, Agent, or Firm* — Suiter Swantz pc llo (57) ABSTRACT

A powdered mixture that may be added to the water or food of animals. The powder comprises a mixture, which includes brewer's yeast, *Aronia* extract, cranberry extract, and an omega-3 fatty acid (such as docosahexaenoic acid (DHA)). In some embodiments, the mixture of the powder also includes one or more of the following: an added amount of citric acid, potassium chloride, tricalcium phosphate, water-soluble egg membrane complex, an added amount of vitamin E, a meat flavor agent (such as natural bacon flavor), and other suitable ingredients.

11 Claims, 1 Drawing Sheet

FIG. 1D

NUTRITIONAL POWDER INCLUDING BREWER'S YEAST, ARONIA EXTRACT, AND CRANBERRY EXTRACT FOR ANIMALS

CROSS-REFERENCE TO RELATED APPLICATIONS

The present application claims the benefit under:

(1) 35 U.S.C. §120 as a continuation-in-part of U.S. patent application Ser. No. 13/234,251 filed on Sep. 16, 2011, which claims the benefit under 35 U.S.C. §119(e) of U.S. Provisional Application Ser. No. 61/383,467 filed on Sep. 16, 2010, U.S. Provisional Application Ser. No. 61/470,621 filed on Apr. 1, 2011, and U.S. Provisional Application Ser. No. 61/509,136 filed on Jul. 19, 2011; and (2) 35 U.S.C. §119(e) of U.S. Provisional Application Ser. No. 61/931,879, filed Jan. 27, 2014.

U.S. patent application Ser. No. 13/234,251 and U.S. Provisional Application Ser. Nos. 61/383,467, 61/470,621, 61/509,136, and 61/931,879 are herein incorporated by reference in their entirety.

TECHNICAL FIELD

Embodiments of the invention are directed generally toward supplements for animals and more particularly to a nutrient additive to animal drinking water or food.

BACKGROUND

Ensuring proper health, nutrition, and hydration is an emphasis in the promotion of animal health and well being. Animals, such as canines and swine, are susceptible to becoming malnourished, nutrient deficient, or dehydrated. Additionally, some animals treated with veterinary medicine are reluctant to ingest veterinary medicines, veterinary agents, veterinary pharmaceutical agents, or other supplements.

Dehydration in animals, such as dogs and swine, is a serious problem. Sweating in dogs is more difficult than humans because the sweat glands in dogs are located on the nose and on the footpads. Additionally, swine (and especially piglets) are susceptible to certain diseases, such as Porcine Epidemic Diarrhea (PED) virus; PED virus can cause chronic diarrhea, which results in serious dehydration and often widespread death in swine herds.

For dogs, dehydration may be exacerbated by participating in strenuous and physical activities in the presence of excessive heat. Dehydration may be further exacerbated by the problem that a dehydrated dog can over-exert itself to the point of death when the dog is excited about an activity in which the dog is participating in. For example, every year numerous hunting canines perish because the canines become dehydrated and over-exerted on hunting trips.

There are many symptoms of dehydration in dogs due to increased strenuous activity. One of the major symptoms of dog dehydration is loss of skin elasticity. A major sign of loss of skin elasticity is the skin on the back of the dog folds over and does not return to normal shape after tension is applied. Symptoms of dehydration include lethargy, sunken eyes, loss of appetite, and slow capillary time. Another symptom may include that the color does not return to the gingiva of a dog, after pressure is applied. Another symptom is dry mouth, which makes it more difficult for a dog to eat.

The most common form of dehydration in dogs is an isotonic dehydration, which is the loss of both water and electrolytes.

To prevent dehydration in canines, canines should be encouraged to drink frequently before, during, and after strenuous activity.

Therefore, it would be desirable to provide a composition, mixture, or powder which provides a solution to the above-referenced problems.

SUMMARY

Accordingly an embodiment includes a powdered mixture that may be added to water or food of animals. The powder may comprise a mixture, which includes brewer's yeast, *Aronia* extract, cranberry extract, and an omega-3 fatty acid.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE DRAWINGS

Other embodiments of the invention will become apparent by reference to the accompanying figures in which.

DETAILED DESCRIPTION

Reference will now be made in detail to the subject matter disclosed, which is illustrated in the accompanying drawings. The scope of embodiments of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention pertain to promoting the diet, health, and overall well-being of animals, including livestock (e.g., swine and cattle) and pets (e.g., dogs or cats). An embodiment of the invention may include a supplement or veterinary agent used for promoting animal health or treating or preventing animal medical conditions, such as dehydration and vitamin deficiency in animals. Embodiments, which include cranberry extract, further enhance oral health (e.g., cranberry fights and prevents plaque formation). Additionally, embodiments, which include DHA and/or Brewer's yeast, improve coat and skin health. Embodiments, which include *Aronia* extract, aid in digestion. Furthermore, embodiments boost the immune system.

Preferred embodiments of the invention include a powdered mixture that may be added to the water or food of animals. Embodiments include a powder comprising a mixture, which includes brewer's yeast, *Aronia* extract, cranberry extract, and an omega-3 fatty acid (such as docosahexaenoic acid (DHA)). In some embodiments, the mixture of the powder also includes one or more of the following: an added amount of citric acid, potassium chloride, tricalcium phosphate, water-soluble egg membrane complex, an added amount of vitamin E, a meat flavor agent (such as natural bacon flavor), and other suitable ingredients (such as those disclosed throughout). In some embodiments, the powder is an effervescent powder.

The powder of preferred embodiments may be added to animal drinking water or food. For example, the powder may be added sprinkled on or mixed with food. The powder may be added to any of various animal's food or water; for example, the powder may be mixed in a dog's water or mixed in with swine feed. Additionally, the powder may be mixed with a liquid and poured over food.

The *Aronia* extract provides many animal health benefits. The animal health benefits of *Aronia* extract include support for the cardiovascular system, support for glucose metabolism and blood sugar levels, support for healthy aging, support for immune and inflammation responses, and support for the gastric system.

Dried cranberry extract provides many animal health benefits. Cranberry extract helps with Urinary Tract Infections (UTI). Cranberry extract is also a plaque inhibitor for animal teeth. Cranberry extract includes proanthocyanidins (PACs), which are effective against the bacterial strain *Streptococcus mutans*, a primary strain of bacteria that causes plaque buildup, as well as tooth decay.

The docosahexaenoic acid (DHA) provides many animal health benefits. DHA is an omega-3 fatty acid. DHA is often derived from or comes in the form of dried, whole-cell algae from a vegetarian source. DHA improve coat shine and skin health in dogs and supports brain and eye development in young animals.

The brewer's yeast also provides many animal health benefits. The brewer's yeast may be naturally debittered prior to drying. The brewer's yeast may be kept cold prior to drying to prevent fermentation. Liquid brewer's yeast may be dried fresh using a gentle roller drying process, which allows its nutrient levels and fresh yeast aroma and taste to be maintained. The brewer's yeast may be free of antibiotics. Brewer's yeast is rich in naturally occurring B-vitamins and trace minerals. Brewer's yeast provides nutritional, palatability and digestibility enhancement to animal and pet foods.

The water-soluble egg membrane complex also provides many animal health benefits. The water-soluble egg membrane complex may be a natural, water-soluble complex of proteins and small peptides produced by a hydrolization process of egg membrane that provides nutritional building blocks to provide natural joint health, stability and flexibility. Water-soluble egg membrane complex improves the conditions of animals with age-related arthritis, reduced mobility, and reduced activity levels. Water-soluble egg membrane complex improves joint function (especially hip joint function) of animals.

A further particular exemplary embodiment of the invention may include an effervescent composition to increase the palatability and nutritional benefits of animal drinking water. This particular exemplary embodiment may be used to mitigate, prevent, pretreat or treat canine dehydration. In a preferred form of the particular exemplary embodiment, the effervescent composition may be added to a canine's drinking water to produce a rehydrating canine drink with the correct concentrations of desired active ingredients for a particular canine or class of canines. A class of canines may include canines of a certain mass, age group, gender, body type, breed, and/or purpose, season, or activity. The active ingredients may be selected from a first active agent including an anti-oxidant such as cyanidin-3-galactoside, epicatechin, quercetin, caffeic acid, delphinidin, malvidin, petunidin, pelargonidin, and peonidin; and a second active agent including water-soluble vitamins and minerals. Concentrations of active ingredients for embodiments of the invention may be selected specifically for a particular canine or a particular class of canines. The effervescent composition may also include flavor agents, including protein flavor agents or umami flavor agents. A water-soluble binder may also be included.

Embodiments of the invention may include a water dispersible or water-soluble active agent. The active agent may include nutritional supplements or veterinary agents, which may be used to promote animal health or treat or prevent animal conditions, such as vitamin deficiencies (e.g., Vitamin B and Vitamin C deficiency) or dehydration. For example, the water-soluble or water dispersible nutritional supplement or veterinary agent may further boost a dog's immune system, prevent anemia, or boost a dog's energy level.

Embodiments of the invention may include water-soluble or water dispersible active agents, including nutritional supplements or veterinary agents. The nutritional supplements may comprise one or more nutrients, vitamins, electrolytes, or minerals, such as Vitamin B complex, Sodium, Potassium, or Vitamin C. Veterinary agents may include any water soluble or dispersible veterinary pharmaceutical agent or water soluble or water dispersible veterinary medicine. The nutritional supplement or veterinary agent may be introduced into an animal's drinking water as a powder or liquid. The water-soluble or water dispersible nutritional supplement or veterinary agent may also be contained within an effervescent composition, such as powder, granules, pellets, or tablets.

Some embodiments may include nutrients of Vitamin B complex, Sodium, Potassium, Magnesium, Vitamin C and anti-oxidants, which may include *Aronia*. For example, the water soluble or water dispersible nutritional supplement or veterinary agent may include concentrations as set forth in Tables 1-4 (below).

Active agents of some embodiments of the invention may include *Aronia* (e.g., dried *Aronia* extract or powder). *Aronia* extract contains anti-oxidants from the *Aronia* berry. *Aronia* extract may protect against diseases that result from the chemical reaction of oxidation. *Aronia* extract has a high Oxygen Radical Absorbance Capacity (ORAC) score, which is indicative of *Aronia*'s strong anti-oxidant capacity. As a result, *Aronia* has a high ability to counteract oxygen free radicals, which may lead to various diseases. By preventing free oxygen radicals, anti-oxidants, such as those present in *Aronia*, are able to protect cells from oxidative damage. *Aronia* has a total ORAC score of 16,075 umoleTE/g. *Aronia*'s anti-oxidant capability is considerably higher than other fruits such as Blueberries (with an ORAC score of 6,552) and Raspberries (with an ORAC score of 4,882). *Aronia* extract may be included in a supplement for animals, such as swine or dogs.

In some embodiments, a water-soluble or water dispersible nutritional supplement or veterinary agent may include nutrients, veterinary agents, or combinations thereof. The nutrients may include vitamins, electrolytes, or minerals, or combinations thereof (e.g., Vitamin B complex, Sodium, Potassium, or Vitamin C). The water-soluble or water dispersible nutritional supplement or veterinary agent may be introduced into an animal's drinking water as a water-soluble powder or liquid. Additionally, in particular embodiments, the water-soluble or water dispersible nutritional supplement or veterinary agent may be included in an effervescent composition such as within compositions, granules, pellets, or powder.

Embodiments of the invention may also include one or more flavor agents. Flavor agents may add one or more flavors to an animal's drinking water and may make the water more appealing to animals. Flavor agents may include any suitable or available flavor. Flavor agents may be water dispersible or water-soluble. Flavor agents may also include protein flavor agents. Protein flavor agents may add protein flavor when introduced to water. Protein flavor agents may include meat flavor agents. Protein flavor agents may include as poultry flavor agents, fish flavor agents, pork flavor agents, egg flavor agents, cheese flavor agents, beef flavor agents, or combinations thereof. For example, the protein flavor agents may impart chicken, beef, steak, or bacon flavor in an animal's drinking water. Preferred embodiments may include poultry flavor agents, pork flavor agents, and beef flavor agents and may impart chicken, bacon, and beef flavor in animal drinking water. A savory or umami flavoring agent may be selected from, e.g., kombu, seaweed, katsuobush/dried bonito flakes, niboshi/small dried sardines, bonito, mackerel, sea bream, tuna, cod, prawns, squid, oysters, shellfish, tomatoes, shiitake mushrooms, enokitake mushrooms, truffles, soy beans, potatoes, sweet potatoes, chinese cabbage, carrots, beef, pork, chicken, parmesan cheese, green tea, soy sauce, chicken egg, or oyster sauce. The umami or savory flavor may be from glutamate.

Some embodiments may include a veterinary agent. Veterinary agents may include veterinary pharmaceutical agents. Suitable veterinary pharmaceutical agents may include an animal medicine which is water soluble or water dispersible.

In some embodiments, a water soluble or water dispersible nutritional supplement or veterinary agent may be introduced to an animal's drinking water in varying degrees of frequency depending on such factors as animal size and how often animal drinking water is changed. For example, one formulated water-soluble or water dispersible nutritional supplement or veterinary agent may be administered once a day by dissolving or dispersing the nutritional supplement or veterinary agent in a dog's drinking water. By further way of example, the water-soluble or water dispersible nutritional supplement or veterinary agent may be dissolved in a dog's drinking water up to once per day. A concentration of the solution may be determined for example in molality. Additionally, the average intake of water per pound of the dog's weight, a ratio of volume of fluid (e.g., fluid ounces) per weight (e.g., pounds) of the dog may be used to determine suitable amounts of active ingredients for dogs of variable size.

In some embodiments, water-soluble or water dispersible nutrient supplement or veterinary agents may comprise effervescent compositions including the water soluble or water dispersible nutrient supplement or veterinary agent. An effervescent composition may include a tablet, pellet, or powder form. Effervescence is a reaction of acids (such as ascorbic acid, citric acid, tartaric acid, malic acid, fumaric acid, adipic acid, acid citrates, succinic acid, or the like) and bases (such as sodium bicarbonate, potassium bicarbonate, sodium carbonate, potassium carbonate, magnesium carbonate, sodium glycocarbonate, carboxylsine, or the like) in water that releases carbon dioxide. Effervescence has the advantage that the carbon dioxide released during the effervescence may produce a self-mixing or dispersing effect, which can promote a higher degree of dissolution (including up to complete dissolution) or dispersion of a nutrient supplement in water. The effervescent composition for use with the water soluble or water dispersible nutrient supplement or veterinary agent may further include the use of binders (e.g., dextrose, sorbitol, xyitol, lactose, or the like) to hold the effervescent material and water soluble or water dispersible active agents together in a solid form, such as in a tablet or pellet form. Additionally, effervescence may promote dispersion or form emulsions of hydrophyllic compounds useful in promoting health in animals. A water soluble or water dispersible nutritional supplement or veterinary agent may be included in an effervescent composition in such form as tablet, pellet, granule, or powder.

Figure 1A:
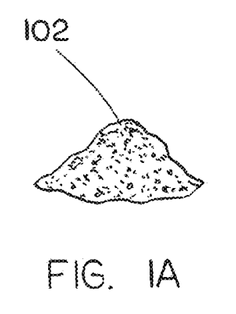
FIG. 1A shows a composition of an embodiment of the invention.
Figures 1B, 1C:
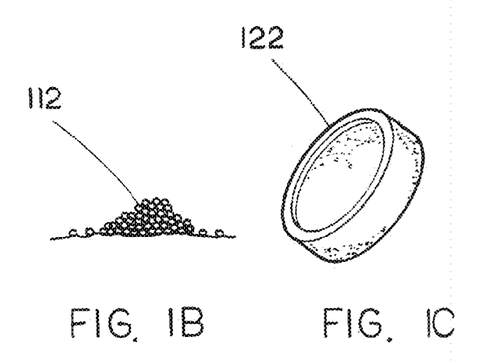
FIG. 1B shows an effervescent composition of an embodiment of the invention.
FIG. 1C shows an effervescent composition of an embodiment of the invention.
Figure 1D:
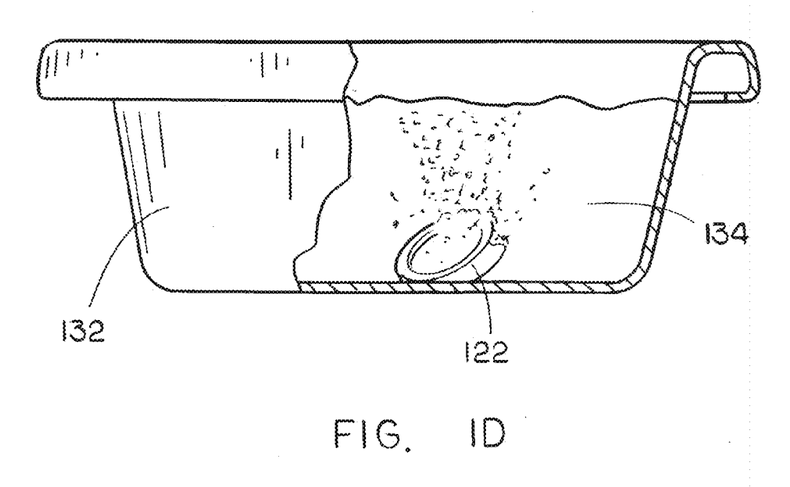
FIG. 1D shows an effervescent composition of an embodiment of the invention effervescing in water.

Referring to FIGS. 1A-1D, embodiments of the invention as suitable effervescent compositions are illustrated. FIGS. 1A, 1B, and 1C depict embodiments of the invention as effervescent powder or granules 102, effervescent pellets 112, and an effervescent tablet 122, respectively. FIG. 1D depicts an effervescent tablet 122 effervescing and dispersing active agents and flavor agents in animal drinking water 134 contained within an animal drinking water container 132. In some embodiments, the effervescent powder or granules 102, effervescent pellets 112, or effervescent tablet 122 may be added to (e.g., sprinkled on, mixed in, or dissolved in water and added as a gravy to) an animal's food.

Some embodiments of the invention may include effervescent compositions, such as tablets or powders, which may react and disperse after being introduced into water. For example, effervescent compositions may be produced through a wet granulation process. Wet granulation may be achieved with 0.1 to 1.0% water (weight-to-weight basis). The granulation steps should be well timed and the ingredients mixed thoroughly for even distribution. Then, the mixture may be put into drying ovens. After drying, granulation may be sized, and a final mix may be performed. A fluid-bed dryer may be used in the process of making effervescent granulations. Subsequently, water or binder solution may be sprayed onto the effervescent mixture while it is suspended in a stream of dry air. Humidity should be controlled.

Additionally, vacuum granulators may also be used to make effervescent granulations. Vacuum granulators may require less power and less operating space than other types of granulators. Using vacuum granulators, water or binder solution may be sprayed onto the effervescent mixture during blending.

The effervescent compositions may be packaged in foil. Strict control of temperature and humidity in all areas should be maintained (e.g., 65 to 75° F. with a relative humidity of 10 percent or less) during the packing process to prevent the formulation from undergoing a chemical reaction after it is packaged.

Effervescent compositions may be produced in an environment where humidity is under strict control and may be package in packaging with a suitable moisture barrier, such as foil. Ingredients in the formulation of effervescent compositions may be anhydrous. Suitable packaging may include foil packets and tubes. Foil packaging may also protect ingredients of embodiments of the invention from light exposure, which may for example damage the antioxidants of *Aronia*. The area within the packaging may be large enough to hold the effervescent composition, such as a tablet, without creating stress on the packaging, such as a foil packet, but the packaging should be small enough to reduce the amount of air or humidity that may become trapped in the packaging. For example, a relative humidity of 10 percent may damage an effervescent composition if trapped in close contact with the effervescent composition.

Referring to Tables 1-4 (below), some embodiments of the invention may include formulations for dogs of varying weights. The percentage of each ingredient of formula may be determined by the weight of an animal, such as a dog. For example, Tables 1-4 show suitable amounts of active agents of embodiments of the invention for dog weights between 10 pounds and 70 pounds. For example, one packet may include four grams of an embodiment of the invention, which may be as an effervescent composition, and the contents of the packet may be administered to the drinking water of 10-pound dog. An appropriate amount of the water dispersible or water soluble nutrient supplement or veterinary agent may be administered to a dog of any weight based upon a dosage-to-weight ratio range. Embodiments of the invention may include amounts of vitamins, minerals, and anti-oxidants containing an animal's (e.g., a dog's) daily-required amount. Embodiments of the invention may be administered as a once-a-day supplement to an animal's (e.g., a dog's) diet.

Table 1 shows suitable amounts per dose of some active agents for a 10, 30, 50, and 70 pound dog of some embodiments. Those with reasonable skill may utilize the included disclosure and tables to extrapolate and interpolate amounts and the like for canines of different masses, breeds, and ages.

TABLE 1

| | (mmol) | | | |
|---|---|---|---|---|
| Ingredient | 10 lb | 30 lb | 50 lb | 70 lb |
| Choline | 0.0686 | 0.206 | 0.344 | 0.482 |
| Pantothenic Acid (Vitamin B5) | 0.01824 | 0.0546 | 0.0912 | 0.1277 |
| Niacin (Vitamin B3) | 0.039 | 0.117 | 0.1948 | 0.273 |
| Biotin (Vitamin B7) | 0.000164 | 0.0005 | 0.00082 | 0.00114 |
| Riboflavin (Vitamin B2) | 0.0053 | 0.015942 | 0.02657 | 0.03718 |
| Vitamin B12 | 0.0000236 | 0.0000708 | 0.000118 | 0.0001652 |
| Pyrodoxine (Vitamin B6) | 0.00194 | 0.00582 | 0.00972 | 0.01362 |
| Folic Acid (Vitamin B9) | 0.000182 | 0.000544 | 0.000906 | 0.001268 |
| Inositol (Vitamin B8) | 0.000222 | 0.00066 | 0.00111 | 0.0015540 |
| Sodium | 0.00356 | 0.0107 | 0.01784 | 0.025 |
| Potassium | 0.00204 | 0.00614 | 0.010234 | 0.01432 |
| Magnesium | 0.0032 | 0.00986 | 0.01646 | 0.02304 |
| Ascorbic Acid (Vitamin C) | 0.0136 | 0.04088 | 0.06814 | 0.09538 |
| Aronia | | | | |
| Total Concentration in mmol | 0.3126892 | 0.9390656 | 1.566554 | 2.1945384 |
| Molality | 1.101 m | 1.102 m | 1.1032 m | 1.1039 m |

Table 2 shows suitable masses per dose for some active agents for a 10, 30, 50, and 70 pound dog of some embodiments.

TABLE 2

| | Mass (mg) | | | |
|---|---|---|---|---|
| Ingredient | 10 lb | 30 lb | 50 lb | 70 lb |
| Choline | 4.71 | 14.15 | 23.64 | 33.12 |
| Pantothenic Acid (Vitamin B5) | 3.99 | 11.97 | 19.99 | 27.99 |
| Niacin (Vitamin B3) | 4.8 | 14.4 | 23.98 | 33.61 |
| Biotin (Vitamin B7) | 0.04 | 0.122 | 0.2 | 0.279 |
| Riboflavin (Vitamin B2) | 1.99 | 5.99 | 9.999 | 13.993 |
| Vitamin B12 | 0.0319 | 0.0959 | 0.1599 | 0.2239 |
| Pyrodoxine (Vitamin B6) | 0.3282 | 0.985 | 1.644 | 2.304 |
| Folic Acid (Vitamin B9) | 0.0803 | 0.2401 | 0.3999 | 0.5597 |
| Inositol (Vitamin B8) | 0.03999 | 0.1189 | 0.1999 | 0.2799 |
| Sodium | 0.0818 | 0.246 | 0.41 | 0.575 |
| Potassium | 0.0798 | 0.24 | 0.4001 | 0.5598 |
| Magnesium | 0.07777 | 0.2396 | 0.4 | 0.5599 |
| Ascorbic Acid (Vitamin C) | 2.395 | 7.1997 | 12 | 16.798 |
| Aronia | 15 | 45 | 75 | 105 |

Table 3 shows suitable amounts per dose of some active agents for a 10, 30, 50, and 70 pound dog of some embodiments.

TABLE 3

| | Amounts (mmol) | | | |
|---|---|---|---|---|
| Ingredient | 10 lb | 30 lb | 50 lb | 70 lb |
| Choline | 0.0343 | 0.103 | 0.172 | 0.241 |
| Pantothenic Acid (Vitamin B5) | 0.00912 | 0.0273 | 0.0456 | 0.06385 |
| Niacin (Vitamin B3) | 0.0195 | 0.0585 | 0.0974 | 0.1365 |
| Biotin (Vitamin B7) | 0.000082 | 0.00025 | 0.00041 | 0.00057 |
| Riboflavin (Vitamin B2) | 0.00265 | 0.007971 | 0.013285 | 0.01859 |
| Vitamin B12 | 0.0000118 | 0.0000354 | 0.000059 | 0.0000826 |
| Pyrodoxine (Vitamin B6) | 0.00097 | 0.00291 | 0.00486 | 0.00681 |
| Folic Acid (Vitamin B9) | 0.000091 | 0.000272 | 0.000453 | 0.000634 |
| Inositol (Vitamin B8) | 0.000111 | 0.00033 | 0.000555 | 0.000777 |
| Sodium | 0.00178 | 0.00535 | 0.00892 | 0.0125 |
| Potassium | 0.00102 | 0.00307 | 0.005117 | 0.00716 |
| Magnesium | 0.0016 | 0.00493 | 0.00823 | 0.01152 |
| Ascorbic Acid (Vitamin C) | 0.0068 | 0.02044 | 0.03407 | 0.04769 |
| Total mmol | 0.0780358 | 0.2343584 | 0.390959 | 0.5476836 |
| Molality | .2753 m | .2755 m | .2578 m | .2759 m |

Table 4 shows suitable amounts per dose of some active agents for a 10, 30, 50, and 70 pound dog of some embodiments.

TABLE 4

| | Amounts (mmol) | | | |
|---|---|---|---|---|
| Ingredient | 10 lb | 30 lb | 50 lb | 70 lb |
| Choline | 0.0686 | 0.206 | 0.344 | 0.482 |
| Pantothenic Acid (Vitamin B5) | 0.01824 | 0.0546 | 0.0912 | 0.1277 |
| Niacin (Vitamin B3) | 0.039 | 0.117 | 0.1948 | 0.273 |
| Biotin (Vitamin B7) | 0.000164 | 0.0005 | 0.00082 | 0.00114 |
| Riboflavin (Vitamin B2) | 0.0053 | 0.015942 | 0.02657 | 0.03718 |
| Vitamin B12 | 0.0000236 | 0.0000708 | 0.000118 | 0.0001652 |
| Pyrodoxine (Vitamin B6) | 0.00194 | 0.00582 | 0.00972 | 0.01362 |
| Folic Acid (Vitamin B9) | 0.000182 | 0.000544 | 0.000906 | 0.001268 |
| Inositol (Vitamin B8) | 0.000222 | 0.00066 | 0.00111 | 0.001554 |
| Sodium | 0.00356 | 0.0107 | 0.01784 | 0.025 |
| Potassium | 0.00204 | 0.00614 | 0.010234 | 0.01432 |
| Magnesium | 0.0032 | 0.00986 | 0.01646 | 0.02304 |
| Ascorbic Acid (Vitamin C) | 0.0136 | 0.04088 | 0.06814 | 0.09538 |
| Total mmol | 0.3121432 | 0.9374336 | 1.563836 | 2.1907344 |
| Molality | 1.101 m | 1.102 m | 1.1032 m | 1.1039 m |

Table 5 shows exemplary suitable masses per dose for some active agents per 25 pounds of dog of some embodiments. In exemplary embodiments, the dose comprises 1 gram of powder; however, it is fully contemplated that the powder may be diluted or made more potent to have any suitable amount of powder having the selected amounts of ingredients. For example, dogs between 5 pounds and 25 pounds may be given 1 gram of powder, which contains amounts of ingredients selected from Table 5 per 1 gram of powder; dogs between 26 pounds and 50 pounds may be given 2 grams of powder, which contains amounts of ingredients selected from Table 5 per 1 gram of powder; dogs between 51 pounds and 74 pounds may be given 3 grams of powder; dogs that weigh 75 pounds or more may be given 3 grams of powder.

TABLE 5

Exemplary embodiment:
Suitable ranges of masses (mg) of some
ingredients per dose for a 25 lb. dog

|  | Low | High |
|---|---|---|
| Brewers yeast | 400 | 700 |
| Sodium Bicarbonate | 80 | 120 |
| Potassium Chloride | 30 | 60 |
| DHA | 30 | 50 |
| Sodium Chloride | 10 | 30 |
| Aronia extract | 20 | 40 |
| Cranberry extract | 10 | 20 |
| Natural Bacon Flavor | | |

Table 6 shows suitable masses per dose for some active agents per 25 pounds of dog of some embodiments. In exemplary embodiments, the dose comprises 1 gram of powder; however, it is fully contemplated that the powder may be diluted or made more potent to have any suitable amount of powder having the selected amounts of ingredients. For example, dogs between 5 pounds and 25 pounds may be given 1 gram of powder, which contains amounts of ingredients selected from Table 6 per 1 gram of powder; dogs between 26 pounds and 50 pounds may be given 2 grams of powder, which contains amounts of ingredients selected from Table 6 per 1 gram of powder; dogs between 51 pounds and 74 pounds may be given 3 grams of powder; dogs that weigh 75 pounds or more may be given 4 grams of powder.

TABLE 6

Exemplary embodiment:
Masses (mg) of some ingredients
per dose for a 25 lb. dog

| Brewers yeast | 500 |
|---|---|
| Sodium Bicarbonate | 100 |
| Potassium Chloride | 50 |
| DHA | 40 |
| Sodium Chloride | 20 |
| Aronia extract | 30 |
| Cranberry extract | 15 |
| Natural Bacon Flavor | |

Table 7 shows suitable masses per dose for some active agents per 25 pounds of dog of some embodiments. In exemplary embodiments, the dose comprises 1 gram of powder; however, it is fully contemplated that the powder may be diluted or made more potent to have any suitable amount of powder having the selected amounts of ingredients. For example, dogs between 5 pounds and 25 pounds may be given 1 gram of powder, which contains amounts of ingredients selected from Table 7 per 1 gram of powder; dogs between 26 pounds and 50 pounds may be given 2 grams of powder, which contains amounts of ingredients selected from Table 7 per 1 gram of powder; dogs between 51 pounds and 74 pounds may be given 3 grams of powder; dogs that weigh 75 pounds or more may be given 4 grams of powder.

TABLE 7

Exemplary embodiment:
Suitable ranges of masses (mg) of some
ingredients per dose for a 25 lb. dog

|  | Min | Max |
|---|---|---|
| Brewers yeast | 0 | 5000 |
| Sodium Bicarbonate | 0 | 1000 |
| Potassium Chloride | 0 | 500 |
| DHA | 0 | 400 |
| Sodium Chloride | 0 | 200 |
| Aronia extract | 0 | 300 |
| Cranberry extract | 0 | 150 |
| Natural Bacon Flavor | | |

Table 8 shows suitable masses per dose for some active agents per 25 pounds of dog of some embodiments. In exemplary embodiments, the dose comprises 1 gram of powder; however, it is fully contemplated that the powder may be diluted or made more potent to have any suitable amount of powder having the selected amounts of ingredients. For example, dogs between 5 pounds and 25 pounds may be given 1 gram of powder, which contains amounts of ingredients selected from Table 8 per 1 gram of powder; dogs between 26 pounds and 50 pounds may be given 2 grams of powder, which contains amounts of ingredients selected from Table 8 per 1 gram of powder; dogs between 51 pounds and 74 pounds may be given 3 grams of powder; dogs that weigh 75 pounds or more may be given 4 grams of powder.

TABLE 8

Further exemplary embodiment
Masses (mg) of some ingredients
per dose for a 25 lb. dog

| Total Carbohydrates | 3000 |
|---|---|
| Sugars | 3000 |
| Vitamin C | 4 |
| Riboflavin | 2 |
| Niacin | 5 |
| Vitamin B6 | 0.5 |
| Folic Acid | 0.1 |
| Vitamin B12 | 0.04 |
| Pantothenic Acid | 4 |
| Biotin | 0.04 |
| Choline (Bitartrate) | 4 |
| Inositol | 0.05 |
| Magnesium (Oxide) | 0.08 |
| Sodium | 0.05 |
| Potassium | 0.08 |
| Aronia extract | 10 |
| Cranberry Extract | 10 |
| Dextrose | |
| Citric Acid | |
| Natural Bacon Flavor | |

Table 9 shows suitable masses per dose for some active agents per 25 pounds of dog of some embodiments. In exemplary embodiments, the dose comprises 1 gram of powder; however, it is fully contemplated that the powder may be diluted or made more potent to have any suitable amount of powder having the selected amounts of ingredients. For example, dogs between 5 pounds and 25 pounds may be given 1 gram of powder, which contains amounts of ingredients selected from Table 9 per 1 gram of powder; dogs between 26 pounds and 50 pounds may be given 2 grams of powder, which contains amounts of ingredients selected from Table 9 per 1 gram of powder; dogs between 51 pounds and 74 pounds may be given 3 grams of powder; dogs that weigh 75 pounds or more may be given 4 grams of powder.

TABLE 9

Further exemplary embodiment
Suitable ranges of masses (mg) of some
ingredients per dose for a 25 lb. dog

|  | Min | Max |
|---|---|---|
| Total Carbohydrates | 0 | 30000 |
| Sugars | 0 | 30000 |
| Vitamin C | 0 | 40 |
| Riboflavin | 0 | 20 |
| Niacin | 0 | 50 |
| Vitamin B6 | 0 | 5 |
| Folic Acid | 0 | 1 |
| Vitamin B12 | 0 | 0.4 |
| Pantothenic Acid | 0 | 40 |
| Biotin | 0 | 0.4 |
| Choline (Bitartrate) | 0 | 40 |
| Inositol | 0 | 0.5 |
| Magnesium (Oxide) | 0 | 0.8 |
| Sodium | 0 | 0.5 |
| Potassium | 0 | 0.8 |
| Aronia extract | 0 | 100 |
| Cranberry Extract | 0 | 100 |
| Dextrose |  |  |
| Citric Acid |  |  |
| Natural Bacon Flavor |  |  |

Table 10 shows exemplary ingredients of a powder of a first preferred embodiment, as well as suitable masses of the ingredients per 1 gram of the powder of the first preferred embodiment. The other ingredient(s) may comprise any of the ingredients disclosed throughout the disclosure, as well as additional ingredients not specifically disclosed in the disclosure. Furthermore, as shown in Table 10, the listed amount of each ingredient is in addition to any amount that may be included in other listed ingredients; for example, the listed amounts of Vitamin E and citric acid are in addition to any amounts of Vitamin E and citric acid which may be present in the dried *Aronia* extract and dried cranberry extract.

TABLE 10

First Preferred Embodiment (General):
Suitable masses (mg) of some ingredients
per 1 gram of powder

| Brewers yeast | 445 |
|---|---|
| Citric Acid | 230 |
| Potassium Chloride | 50 |
| DHA | 30 |
| Aronia extract | 30 |
| Cranberry extract | 15 |
| Tricalcium Phosphate | 12 |
| Vitamin E | 3 |
| Bacon Flavor | 35 |
| Other Ingredient(s) | 150 |

Table 11 shows exemplary ingredients of a powder of a second preferred embodiment, as well as suitable masses of the ingredients per 1 gram of the powder of the second preferred embodiment. The other ingredient(s) may comprise any of the ingredients disclosed throughout the disclosure, as well as additional ingredients not specifically disclosed in the disclosure. Furthermore, as shown in Table 10, the listed amount of each ingredient is in addition to any amount that may be included in other listed ingredients; for example, the listed amounts of Vitamin E and citric acid are in addition to any amounts of Vitamin E and citric acid which may be present in the *Aronia* extract and cranberry extract.

TABLE 11

Second Preferred Embodiment
(with water-soluble egg membrane complex):
Suitable masses (mg) of some ingredients
per 1 gram of powder

| Brewers yeast | 385 |
|---|---|
| Citric Acid | 230 |
| Potassium Chloride | 50 |
| DHA | 30 |
| Aronia extract | 30 |
| Cranberry extract | 15 |
| Tricalcium Phosphate | 12 |
| Vitamin E | 3 |
| Bacon Flavor | 35 |
| Soluble Egg Membrane | 60 |
| Other Ingredient(s) | 150 |

Table 12 shows exemplary ingredients of a powder of the first preferred embodiment, as well as suitable ranges of masses of the ingredients per 1 gram of the powder of the first preferred embodiment. The other ingredient(s) may comprise any of the ingredients disclosed throughout the disclosure, as well as additional ingredients not specifically disclosed in the disclosure. Furthermore, as shown in Table 10, the listed amount of each ingredient is in addition to any amount that may be included in other listed ingredients; for example, the listed amounts of Vitamin E and citric acid are in addition to any amounts of Vitamin E and citric acid which may be present in the *Aronia* extract and cranberry extract.

TABLE 12

First Preferred Embodiment (General)
Suitable ranges of masses (mg) of some
ingredients per 1 gram of powder

|  | Min | Max |
|---|---|---|
| Brewers yeast | 350 | 450 |
| Citric Acid | 200 | 300 |
| Potassium Chloride | 40 | 60 |
| DHA | 25 | 40 |
| Aronia extract | 20 | 40 |
| Cranberry extract | 10 | 20 |
| Tricalcium Phosphate | 5 | 15 |
| Vitamin E | 1 | 15 |
| Other Ingredient(s) | Balance | 349 |

Table 13 shows exemplary ingredients of a powder of the second preferred embodiment, as well as suitable ranges of masses of the ingredients per 1 gram of the powder of the second preferred embodiment. The other ingredient(s) may comprise any of the ingredients disclosed throughout the disclosure, as well as additional ingredients not specifically disclosed in the disclosure. Furthermore, as shown in Table 10, the listed amount of each ingredient is in addition to any amount that may be included in other listed ingredients; for example, the listed amounts of Vitamin E and citric acid are in addition to any amounts of Vitamin E and citric acid which may be present in the *Aronia* extract and cranberry extract.

TABLE 13

Second Preferred Embodiment
(with water-soluble egg membrane complex):
Suitable ranges of masses (mg) of some
ingredients per 1 gram of powder

| | Min | Max |
|---|---|---|
| Brewers yeast | 350 | 450 |
| Citric Acid | 200 | 300 |
| Potassium Chloride | 40 | 60 |
| DHA | 25 | 40 |
| Aronia extract | 20 | 40 |
| Cranberry extract | 10 | 20 |
| Tricalcium Phosphate | 5 | 15 |
| Vitamin E | 1 | 15 |
| Soluble Egg Membrane | 50 | 80 |
| Other Ingredient(s) | Balance | 299 |

Table 14 shows exemplary ingredients of a powder of the first preferred embodiment, as well as other suitable ranges of masses of the ingredients per 1 gram of the powder of the first preferred embodiment. The other ingredient(s) may comprise any of the ingredients disclosed throughout the disclosure, as well as additional ingredients not specifically disclosed in the disclosure. Furthermore, as shown in Table 10, the listed amount of each ingredient is in addition to any amount that may be included in other listed ingredients; for example, the listed amounts of Vitamin E and citric acid are in addition to any amounts of Vitamin E and citric acid which may be present in the *Aronia* extract and cranberry extract. Additionally, while the sum of each individual ingredient's maximum amount exceeds 1000 mg per 1 gram of the powder, the preferred embodiments include selected amounts from the listed ranges such that the sum of the selected amounts of the ingredients does not exceed 1000 mg per 1 gram of the powder.

TABLE 14

First Preferred Embodiment (General):
Other suitable ranges of masses (mg)
of ingredients per 1 g of powder

| | Min | Max |
|---|---|---|
| Brewers yeast | 200 | 600 |
| Citric Acid | 100 | 500 |
| Potassium Chloride | 30 | 100 |
| DHA | 20 | 60 |
| Aronia extract | 10 | 60 |
| Cranberry extract | 5 | 40 |
| Tricalcium Phosphate | 1 | 30 |
| Vitamin E | 0.1 | 30 |
| Other Ingredient(s) | Balance | 633.9 |

Table 15 shows exemplary ingredients of a powder of the second preferred embodiment, as well as other suitable ranges of masses of the ingredients per 1 gram of the powder of the second preferred embodiment. The other ingredient(s) may comprise any of the ingredients disclosed throughout the disclosure, as well as additional ingredients not specifically disclosed in the disclosure. Furthermore, as shown in Table 10, the listed amount of each ingredient is in addition to any amount that may be included in other listed ingredients; for example, the listed amounts of Vitamin E and citric acid are in addition to any amounts of Vitamin E and citric acid which may be present in the *Aronia* extract and cranberry extract. Additionally, while the sum of each individual ingredient's maximum amount exceeds 1000 mg per 1 gram of the powder, the preferred embodiments include selected amounts from the listed ranges such that the sum of the selected amounts of the ingredients does not exceed 1000 mg per 1 gram of the powder.

TABLE 15

Second Preferred Embodiment
(with water-soluble egg membrane complex):
Other suitable ranges of masses (mg)
of ingredients per 1 g of powder

| | Min | Max |
|---|---|---|
| Brewers yeast | 200 | 600 |
| Citric Acid | 100 | 500 |
| Potassium Chloride | 30 | 100 |
| DHA | 20 | 60 |
| Aronia extract | 10 | 60 |
| Cranberry extract | 5 | 40 |
| Tricalcium Phosphate | 1 | 30 |
| Vitamin E | 0.1 | 30 |
| Soluble Egg Membrane | 40 | 100 |
| Other Ingredient(s) | Balance | 593.9 |

It is believed that embodiments of the invention and many of its attendant advantages will be understood by the foregoing description, and it will be apparent that various changes can be made in the ingredients, form, composition, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A powdered mixture for animals, the powdered mixture consisting of
a powder, the powder being a mixture consisting of brewer's yeast, *Aronia* extract, cranberry extract, at least one omega-3 fatty acid comprising of at least docosahexaenoic acid (DHA), an added amount of citric acid, potassium chloride, tricalcium phosphate, an added amount of vitamin E, and optionally one or more ingredients from the group consisting of at least one sugar, at least one additional anti-oxidant, at least one binder, at least one additional vitamin, at least one additional mineral, at least one flavor, sorbitol, xylitol, ascorbic acid, tartaric acid, malic acid, fumaric acid, adipic acid, citrates, succinic acid, sodium bicarbonate, potassium bicarbonate, sodium carbonate, potassium carbonate, magnesium carbonate, sodium glycocarbonate, carboxylysine, choline, magnesium oxide, sodium chloride, at least one water-soluble egg membrane complex, and combinations thereof;
wherein the powder is optionally effervescent when added to water;
wherein a ratio of a mass of the brewer's yeast to a mass of the powder is between 350 milligrams (mg) of the brewer's yeast to 1 gram (g) of the powder and 450 mg of the brewer's yeast to 1 g of the powder;
wherein a ratio of a mass of the *Aronia* extract to the mass of the powder is between 20 mg of the *Aronia* extract to 1 g of the powder and 40 mg of the *Aronia* extract to 1 g of the powder;
wherein a ratio of a mass of the cranberry extract to the mass of the powder is between 10 mg of the cranberry extract to 1 g of the powder and 20 mg of the cranberry extract to 1 g of the powder;

wherein a ratio of a mass of the DHA to the mass of the powder is between 25 mg of the DHA to 1 g of the powder and 40 mg of the DHA to 1 g of the powder;

wherein a ratio of a mass of the added amount of the citric acid to the mass of the powder is between 200 mg of the added amount of the citric acid to 1 g of the powder and 300 mg of the added amount of the citric acid to 1 g of the powder;

wherein a ratio of a mass of the potassium chloride to the mass of the powder is between 40 mg of the potassium chloride to 1 g of the powder and 60 mg of the potassium chloride to 1 g of the powder;

wherein a ratio of a mass of the tricalcium phosphate to the mass of the powder is between 5 mg of the tricalcium phosphate to 1 g of the powder and 15 mg of the tricalcium phosphate to 1 g of the powder; and wherein a ratio of a mass of the added amount of the vitamin E to the mass of the powder is between 1 mg of the added amount of the vitamin E to 1 g of the powder and 15 mg of the added amount of the vitamin E to 1 g of the powder.

2. The powdered mixture of claim 1, wherein the mixture includes the at least one water-soluble egg membrane complex, wherein a ratio of a mass of the at least one water-soluble egg membrane complex to the mass of the powder is between 50 mg of the at least one water-soluble egg membrane complex to 1 g of the powder and 80 mg of the at least one water-soluble egg membrane complex to 1 g of the powder.

3. The powdered mixture of claim 1, wherein the mixture includes the at least one flavor, wherein the at least one flavor includes a meat flavor.

4. The powdered mixture of claim 1, wherein the powder is an effervescent powder.

5. A powdered mixture for animals, the powdered mixture consisting of a powder, the powder being a mixture consisting of brewer's yeast, *Aronia* extract, cranberry extract, at least one omega-3 fatty acid comprising of at least docosahexaenoic acid (DHA), an added amount of citric acid, potassium chloride, tricalcium phosphate, an added amount of vitamin E, and optionally one or more ingredients from the group consisting of at least one sugar, at least one additional anti-oxidant, at least one binder, at least one additional vitamin, at least one additional mineral, at least one flavor, sorbitol, xylitol, ascorbic acid, tartaric acid, malic acid, fumaric acid, adipic acid, citrates, succinic acid, sodium bicarbonate, potassium bicarbonate, sodium carbonate, potassium carbonate, magnesium carbonate, sodium glycocarbonate, carboxylysine, choline, magnesium oxide, sodium chloride, at least one water-soluble egg membrane complex, and combinations thereof;

wherein the powder is optionally effervescent when added to water;

wherein a ratio of a mass of the brewer's yeast to a mass of the powder is between 200 milligrams (mg) of the brewer's yeast to 1 gram (g) of the powder and 600 mg of the brewer's yeast to 1 g of the powder;

wherein a ratio of a mass of the *Aronia* extract to the mass of the powder is between 10 mg of the *Aronia* extract to 1 g of the powder and 60 mg of the *Aronia* extract to 1 g of the powder;

wherein a ratio of a mass of the cranberry extract to the mass of the powder is between 5 mg of the cranberry extract to 1 g of the powder and 40 mg of the cranberry extract to 1 g of the powder;

wherein a ratio of a mass of the DHA to the mass of the powder is between 20 mg of the DHA to 1 g of the powder and 60 mg of the DHA to 1 g of the powder;

wherein a ratio of a mass of the added amount of the citric acid to the mass of the powder is between 100 mg of the added amount of the citric acid to 1 g of the powder and 500 mg of the added amount of the citric acid to 1 g of the powder;

wherein a ratio of a mass of the potassium chloride to the mass of the powder is between 30 mg of the potassium chloride to 1 g of the powder and 100 mg of the potassium chloride to 1 g of the powder;

wherein a ratio of a mass of the tricalcium phosphate to the mass of the powder is between 1 mg of the tricalcium phosphate to 1 g of the powder and 30 mg of the tricalcium phosphate to 1 g of the powder;

wherein a ratio of a mass of the added amount of the vitamin E to the mass of the powder is between 0.1 mg of the added amount of the vitamin E to 1 g of the powder and 30 mg of the added amount of the vitamin E to 1 g of the powder; and wherein a combined mass of the brewer's yeast, the *Aronia* extract, the cranberry extract, the DHA, the added amount of citric acid, the potassium chloride, the tricalcium phosphate, and the added amount of vitamin E is less than or equal to 1000 mg per 1 g of the powder.

6. The powdered mixture of claim 5, wherein the mixture includes the at least one water-soluble egg membrane complex, wherein a combined mass of the brewer's yeast, the *Aronia* extract, the cranberry extract, the DHA, the added amount of citric acid, the potassium chloride, the tricalcium phosphate, the added amount of vitamin E, and the at least one water-soluble egg membrane complex is less than or equal to 1000 mg per 1 g of the powder.

7. The powdered mixture of claim 6, wherein a ratio of a mass of the at least one water-soluble egg membrane complex to the mass of the powder is between 40 mg of the at least one water-soluble egg membrane complex to 1 g of the powder and 100 mg of the at least one water-soluble egg membrane complex to 1 g of the powder.

8. The powdered mixture of claim 5, wherein the mixture includes the at least one flavor, wherein the at least one flavor includes a meat flavor, wherein a combined mass of the brewer's yeast, the *Aronia* extract, the cranberry extract, the DHA, the added amount of citric acid, the potassium chloride, the tricalcium phosphate, the added amount of vitamin E, and the meat flavor is less than or equal to 1000 mg per 1 g of the powder.

9. The powdered mixture of claim 5, wherein the powder is an effervescent powder.

10. A powdered mixture for animals, the powdered mixture consisting of a powder, the powder being a mixture consisting of brewer's yeast, *Aronia* extract, cranberry extract, at least one omega-3 fatty acid comprising of at least docosahexaenoic acid (DHA), an added amount of citric acid, potassium chloride, tricalcium phosphate, an added amount of vitamin E, at least one water-soluble egg membrane complex, a meat flavor, and optionally one or more ingredients from the group consisting of at least one sugar, at least one additional anti-oxidant, at least one binder, at least one additional vitamin, at least one additional mineral, at least one additional flavor, sorbitol, xylitol, ascorbic acid, tartaric acid, malic acid, fumaric acid, adipic acid, citrates, succinic acid, sodium bicarbonate, potassium bicarbonate, sodium carbonate, potassium carbonate, magnesium carbonate, sodium glycocarbonate, carboxylysine, choline, magnesium oxide, sodium chloride, and combinations thereof;

wherein the powder is optionally effervescent when added to water;

wherein a ratio of a mass of the brewer's yeast to a mass of the powder is between 200 milligrams (mg) of the brewer's yeast to 1 gram (g) of the powder and 600 mg of the brewer's yeast to 1 g of the powder, wherein a ratio of a mass of the *Aronia* extract to the mass of the powder is between 10 mg of the *Aronia* extract to 1 g of the powder and 60 mg of the *Aronia* extract to 1 g of the powder, wherein a ratio of a mass of the cranberry extract to the mass of the powder is between 5 mg of the cranberry extract to 1 g of the powder and 40 mg of the cranberry extract to 1 g of the powder, and wherein a ratio of a mass of the DHA to the mass of the powder is between 20 mg of the DHA to 1 g of the powder and 60 mg of the DHA to 1 g of the powder.

11. The powdered mixture of claim 1, wherein the *Aronia* extract is for aiding in animal digestion.

\* \* \* \* \*